United States Patent
Fraaije et al.

(10) Patent No.: US 10,358,509 B2
(45) Date of Patent: Jul. 23, 2019

(54) CONTINUOUS GAS-PHASE POLYMERIZATION PROCESSES

(71) Applicant: Basell Polyolefine GmbH, Wesseling (DE)

(72) Inventors: Volker Fraaije, Frankfurt (DE); Michael Lynch, Houston, TX (US); Shahram Mihan, Bad Soden (DE); Gerhardus Meier, Frankfurt (DE); Ulf Schueller, Weiterstadt (DE)

(73) Assignee: Basell Polyolefine GmbH, Wesseling (DE)

( * ) Notice: Subject to any disclaimer, the term of this patent is extended or adjusted under 35 U.S.C. 154(b) by 4 days.

(21) Appl. No.: 15/559,792

(22) PCT Filed: Mar. 23, 2016

(86) PCT No.: PCT/EP2016/056338
§ 371 (c)(1),
(2) Date: Sep. 19, 2017

(87) PCT Pub. No.: WO2016/150996
PCT Pub. Date: Sep. 29, 2016

(65) Prior Publication Data
US 2018/0079842 A1    Mar. 22, 2018

Related U.S. Application Data

(60) Provisional application No. 62/137,883, filed on Mar. 25, 2015.

(51) Int. Cl.
*C08F 10/02* (2006.01)

(52) U.S. Cl.
CPC .......... *C08F 10/02* (2013.01); *C08F 2500/07* (2013.01)

(58) Field of Classification Search
None
See application file for complete search history.

(56) References Cited

U.S. PATENT DOCUMENTS

| 4,882,380 A | 11/1989 | Ficker et al. |
| 8,088,872 B2 | 1/2012 | Chen et al. |
| 2007/0264171 A1* | 11/2007 | Herrmann .............. B01J 8/0055 422/136 |
| 2010/0167058 A1 | 7/2010 | Van Egmond et al. |
| 2013/0345373 A1 | 12/2013 | McDaniel et al. |

FOREIGN PATENT DOCUMENTS

| EP | 2722347 A1 | 4/2014 |
| KR | 20100097284 A | 9/2010 |
| WO | 2005030815 A1 | 4/2005 |
| WO | 2005035597 A1 | 4/2005 |
| WO | 2010082943 A1 | 7/2010 |
| WO | 2015026731 A1 | 2/2015 |
| WO | 2015073221 A1 | 5/2015 |

OTHER PUBLICATIONS

McDaniel, "A Review of the Phillips Supported Chromium Catalyst and Its Commercial Use for Ethylene Polymerization," Advances in Catalysis, vol. 53, 2010, pp. 138-139. (Year: 2010).*
"Antistatic agent for use in food packaging materials," European Coatings Journal, Issue 1, 2001. (Year: 2001).*
"Isopropyl Myristate Product Description," Chemical Book, 2017. (Year: 2017).*
The International Search Report and Written Opinion for PCT/EP2016/056338 dated Jul. 6, 2016.
Ullmann's Encyclopedia of Industrial Chemistry "Polyethylene", section 3.3.2.1 "Phillips Catalysts" and section 5.2.2 "Gas-Phase Process", pp. 1, 19, 31-33, 2014.

* cited by examiner

*Primary Examiner* — Catherine S Branch

(57) ABSTRACT

The present disclosure relates to a continuous process for the preparation of ethylene homopolymers or ethylene copolymers comprising polymerizing ethylene or copolymerizing ethylene and one or more other olefins in the presence of a chromium catalyst in a gas-phase polymerization reactor which is equipped with a cycle gas line for withdrawing reactor gas from the reactor, leading the reactor gas through a heat-exchanger for cooling and feeding the reactor gas back to the reactor, wherein the polymerization is carried out at a temperature from 30° C. to 130° C. and a pressure of from 0.1 to 10 MPa and an aliphatic carboxylic acid ester having from 8 to 24 carbon atoms is added.

19 Claims, No Drawings

CONTINUOUS GAS-PHASE POLYMERIZATION PROCESSES

This application is the U.S. National Phase of PCT International Application PCT/EP2016/056338, filed Mar. 23, 2016, claiming benefit of priority to U.S. Provisional Patent Application No. 62/137,883, filed Mar. 25, 2015, the disclosures of which are incorporated herein by reference in their entirety.

TECHNICAL FIELD

The present disclosure relates to a continuous process for the preparation of ethylene homopolymers or ethylene copolymers comprising polymerizing ethylene or copolymerizing ethylene and one or more other olefins in the presence of a chromium catalyst in a gas-phase polymerization reactor, which contains a reactor bed of particulate polymer and which is equipped with a cycle gas line for withdrawing reactor gas from the reactor, leading the reactor gas through a heat-exchanger for cooling and feeding the reactor gas back to the reactor.

BACKGROUND OF THE INVENTION

Gas-phase polymerization processes are economical processes for the polymerization or copolymerization of olefins. Such gas-phase polymerization processes can be carried out either as gas-phase fluidized-bed processes or as stirred gas-phase processes. A characteristic of gas-phase fluidized-bed processes is that the bed comprising polymerizing polymer particles is kept in the fluidized state by introduction of a gas mixture from below. This gas mixture also removes the heat of polymerization from the reactor. The reaction gas is cooled in a heat exchanger located outside the reactor and is recirculated back into the reactor through a gas distributor plate (cycle gas).

However, the cycle gas also entrains a certain amount of finely divided polymer and carries it from the reactor and into the cycle gas system. These polymer particles comprise active catalyst and can thus polymerize further in the cycle gas system. If these particles deposit in the cycle gas system, deposits and fouling can occur in these places. These deposits can lead to malfunctions (blockage of the cooler, conglutination in the compressor) and parts of these deposits can become detached again. The detached deposits can block the holes of the gas distributor plate of the reactor and thus necessitate system shutdown and costly cleaning. If pieces of detached deposits get through the gas distributor plate into the reactor, the product quality is adversely affected by these particles by the formation of so-called specks or gels. Particularly in the case of products for film applications, out-of-specification material may thus be obtained.

For reducing the proportion of fine polymer dust in the cycle gas system, it is possible to install in the cycle gas line a cyclone downstream of the reactor outlet. However, complete precipitation cannot be achieved by means of a cyclone, as fine dust containing active catalyst may pass the cyclone.

Another option for avoiding fouling and the formation of polymer deposits in the cycle gas system is feeding a catalyst poison into the cycle gas line.

EP 0 431 626 A1 discloses a method for inhibiting polymer build-up in a heat exchanger during the gas phase polymerization of alpha-olefins which comprises introducing para-ethylethoxybenzoate upstream of the heat exchanger in amounts sufficient to inhibit polymer build-up. The prepared polyolefin is preferably a propylene impact copolymer.

U.S. Pat. No. 5,625,012 describes a method for inhibiting polymer build-up in a recycle line and a heat exchanger during a polymerization of one or more alpha olefins in the presence of a transition metal catalyst, which comprises introducing as an antifouling agent an alcohol having 1 to 10 carbon atoms, an alkyl or cycloalkyl ether having 2 to 20 carbon atoms, or a mixture thereof at one or more locations in the recycle gas line in an amount sufficient to inhibit polymer build-up, and discloses the preparation of EPDM rubbers while feeding isopropanol into the cycle gas line.

EP-A-0 927 724 and WO 03/042253 A1 disclose gas-phase polymerization processes in which a catalyst poison having a boiling point above the maximum temperature within the cycle gas line is fed into this cycle gas line to prevent polymer deposits in the cycle gas line. The catalyst poison is preferably an alkylamino ethoxylate.

WO 2006/107373 A1 describes a process for reducing the ultra-high molecular weight polymeric material content of a high density polyethylene produced with a bis-triarylsilyl chromate catalyst system in which a catalyst deactivator, which has a boiling point lower than the maximum temperature within the cycle gas line, is introduced into the recycle gas line.

However, feeding catalyst poisons to ethylene polymerizations carried out in the presence of chromium catalysts may adversely affect the mechanical properties of the resulting polyethylenes and sometimes an increased tendency to yellowing of the obtained polymers is observed. Moreover, adding catalyst poisons can result in an increased content of ultra-high molecular weight polymeric material in the produced polyethylene which is also detrimental to the optical properties and which may further increase the gel level. Consequently, there is still a need for a process for the preparation of ethylene homopolymers or ethylene copolymers in the presence of a chromium catalyst, which process allows preparing ethylene polymers having outstanding optical, mechanical and processing properties and a low gel content and which can be carried out with high catalyst productivity and without operational problems.

SUMMARY OF THE INVENTION

The present disclosure provides a continuous process for the preparation of ethylene homopolymers or ethylene copolymers comprising polymerizing ethylene or copolymerizing ethylene and one or more other olefins in the presence of a chromium catalyst in a gas-phase polymerization reactor, which contains a reactor bed of particulate polymer and which is equipped with a cycle gas line for withdrawing reactor gas from the reactor, leading the reactor gas through a heat-exchanger for cooling and feeding the reactor gas back to the reactor, wherein the polymerization is carried out at a temperature from 30° C. to 130° C. and a pressure of from 0.1 to 10 MPa and an aliphatic carboxylic acid ester having from 8 to 24 carbon atoms is added.

In some embodiments, the aliphatic carboxylic acid ester is fed into the cycle gas system at a position upstream of the heat-exchanger.

In some embodiments, the cycle gas line is equipped with a cyclone upstream of the heat-exchanger and the aliphatic carboxylic acid ester is fed into the cycle gas system at a position between the reactor and the cyclone.

In some embodiments, the mixture of fine dust and aliphatic carboxylic acid ester which has been separated off in the cyclone is added to the polymerization product discharged from the polymerization reactor.

In some embodiments, the aliphatic carboxylic acid ester is added in an amount of from 0.05 ppm to 2 ppm, with respect to the weight of the prepared ethylene polymer.

In some embodiments, the aliphatic carboxylic acid ester has a melting point of less than 20° C.

In some embodiments, the aliphatic carboxylic acid ester is selected from the group consisting of isopropyl myristate, isopropyl laurate, isopropyl palmitate, isopropyl stearate, octylacetate, ethyloleate, laurylacetate, isobutyl myristate, butyl myristate, 2-ethylhexyl myristate, ethyl myristate and mixtures thereof.

In some embodiments, the aliphatic carboxylic acid ester is added together with another polymerization process additive.

In some embodiments, ethylene is copolymerized with 1-butene and/or with 1-hexene.

In some embodiments, the chromium catalyst is a Phillips-type chromium catalyst which has been activated at a temperature of from 350° C. to 1000° C.

In some embodiments, the reactor gas comprises one or more $C_3$-$C_6$ alkanes.

In some embodiments, the content of $C_3$-$C_6$ alkanes in the reactor gas is from 1 vol. % to 10 vol. %.

In some embodiments, the polymerization is carried out in the presence of an aluminum alkyl.

In some embodiments, the ethylene polymer has a density determined according to DIN EN ISO 1183-1:2004, Method A at 23° C. of from 0.918 g/cm³ to 0.970 g/cm³.

In some embodiments, the ethylene polymer has a melt flow rate $MFR_{21}$, determined according to DIN EN ISO 1133:2005 at a temperature of 190° C. under a load of 21.6 kg from 0.1 g/10 min to 100 g/10 min.

DETAILED DESCRIPTION OF THE INVENTION

The present disclosure provides a continuous process for the preparation of ethylene homopolymers or ethylene copolymers comprising polymerizing ethylene or copolymerizing ethylene and one or more other olefins in the presence of a chromium catalyst. Olefins for copolymerization with ethylene may be 1-olefins, i.e. hydrocarbons having terminal double bonds. Olefins which may be copolymerized with ethylene can also be functionalized olefinically unsaturated compounds. Examples for such olefins are linear or branched $C_3$-$C_{12}$-1-alkenes, or linear $C_3$-$C_{10}$-1-alkenes such as propylene, 1-butene, 1-pentene, 1-hexene, 1-heptene, 1-octene, 1-decene or branched $C_2$-$C_{10}$-1-alkenes such as 4-methyl-1-pentene or conjugated and nonconjugated dienes such as 1,3-butadiene, 1,4-hexadiene or 1,7-octadiene. These olefins also include ones in which the double bond is part of a cyclic structure which can have one or more ring systems. Examples are cyclopentene, norbornene, tetracyclododecene or methylnorbornene or dienes such as 5-ethylidene-2-norbornene, norbornadiene or ethylnorbornadiene. It is also possible to polymerize mixtures of two or more olefins.

The process may be used for the homopolymerization or copolymerization of ethylene. Comonomers may be up to 20 wt. %, or from 0.01 wt. % to 15 wt. %, or from 0.05 wt. % to 12 wt. %, of $C_3$-$C_8$-1-alkenes, in particular 1-butene, 1-pentene, 1-hexene and/or 1-octene. In an embodiment of the present disclosure, ethylene is copolymerized with 1-butene and/or with 1-hexene, or ethylene is copolymerized with from 0.1 wt. % to 12 wt. % of 1-hexene and/or 1-butene.

The process of the present disclosure is carried out using a chromium catalyst, for example a Phillips-type chromium catalyst. Phillips-type chromium catalysts may be prepared by applying a chromium compound to an inorganic support and subsequently activating the obtained catalyst precursor, for example in the presence of oxygen or air, at temperatures in the range from 350° C. to 1000° C., resulting in chromium present in valences lower than six being converted into the hexavalent state. Apart from chromium, further elements such as magnesium, calcium, boron, aluminum, phosphorus, titanium, vanadium, zirconium or zinc can also be used or titanium, zirconium or zinc is used in combination with chromium. Combinations of the above mentioned elements are also possible. The catalyst precursor can be doped with fluoride prior to or during activation. As supports for Phillips-type catalysts, aluminum oxide, silicon dioxide (silica gel), titanium dioxide, zirconium dioxide or their mixed oxides or cogels, or aluminum phosphate may be used. Further support materials can be obtained by modifying the pore surface area, e.g. by means of compounds of the elements boron, aluminum, silicon or phosphorus. The support material can be a silica gel, such as granular silica gels, with the former also being able to be spray dried. Further support materials can be obtained by chemical modification of inorganic support materials e.g. by means of compounds of the elements boron, aluminium, silicon or phosphorus. The activated chromium catalysts can subsequently be prepolymerized or prereduced. The prereduction can, for example, be carried out by means of carbonmonoxide, hydrogen, ethylene, 1-olefins or metal alkyls.

The process of the present disclosure is carried out as gas-phase polymerization, i.e. as process in which the solid polymers are obtained from a gas-phase of the monomer or the monomers in a gas-phase polymerization reactor containing a reactor bed of particulate polymer. The gas-phase polymerization reactor is equipped with at least one cycle gas line for withdrawing reactor gas from the reactor, leading the reactor gas through a heat-exchanger for cooling and feeding the reactor gas back to the reactor. These reactors can be, for example, stirred gas-phase reactors, multizone circulating gas-phase reactors, or fluidized-bed gas-phase reactors.

Stirred gas-phase reactors, in which the reaction bed of polymer particles is kept in motion by means of a stirrer, can for example be horizontally or vertically stirred gas-phase reactors. The cooling of the polymerization may occur by withdrawing reactor gas from the reactor, leading the reactor gas through a heat-exchanger and feeding the reactor gas back to the reactor.

Multizone circulating reactors are gas-phase reactors in which two polymerization zones are linked to one another and the polymer is passed alternately a plurality of times through these two zones. Such reactors are, for example, described in WO 97/04015 A1 and WO 00/02929 A1 and have two interconnected polymerization zones, a riser, in which the growing polymer particles flow upward under fast fluidization or transport conditions, and a downcomer, in which the growing polymer particles flow in a densified form under the action of gravity. The polymer particles leaving the riser enter the downcomer and the polymer particles leaving the downcomer are reintroduced into the riser, thus establishing a circulation of polymer between the two polymerization zones, and the polymer is passed alternately a plurality of times through these two zones. It is also possible to operate the two polymerization zones of one multizone circulating reactor with different polymerization conditions by establishing different polymerization conditions in its riser and its downcomer. For this purpose, the gas mixture leaving the riser and entraining the polymer particles can be partially or totally prevented from entering the downcomer. This can for example be achieved by feeding a barrier fluid in the form of a gas and/or a liquid mixture into the downcomer, for example in the upper part of the downcomer. The barrier fluid may have a composition different from that of the gas mixture present in the riser. The amount of added barrier fluid can be adjusted in a way that an upward flow of gas countercurrent to the flow of the polymer particles is generated, particularly at the top, acting as a barrier to the gas mixture entrained among the particles coming from the riser. In this manner it is possible to obtain two different gas composition zones in one multizone circulating reactor. Furthermore, it is possible to introduce make-up monomers, comonomers, molecular weight regulators such as hydrogen and/or inert fluids at any point of the downcomer, such as below the barrier feeding point. Thus, it is also possible to create varying monomer, comonomer and/or hydrogen concentrations along the downcomer, resulting in a further differentiation of the polymerization conditions. The cooling of the polymerization may occur by withdrawing reactor gas leaving the riser, leading the reactor gas through a heat-exchanger and feeding the cooled reactor gas back to the reactor at a position before the riser for fast-fluidizing the polymer particles in the riser.

The process of the present disclosure can be carried out in a fluidized-bed gas-phase reactor. Fluidized-bed polymerization reactors are reactors in which the polymerization takes place in a bed of polymer particles which is maintained in a fluidized state by feeding in gas at the lower end of the reactor, such as below a gas distribution grid having the function of dispensing the gas flow, and taking off the gas again at the upper end of the reactor. The reactor gas is then returned to the lower end to the reactor via a cycle gas line equipped with a compressor and a heat exchanger.

The velocity of the reactor gas within the fluidized-bed reactor has to be sufficiently high to fluidize the bed of particulate polymer present in the tube serving as polymerization zone and to remove the heat of polymerization effectively. The velocity of the reactor gas velocity may be specified as superficial velocity. To prevent the unintended transfer of small particles being carried from the polymerization zone into the cycle gas system, the gas-phase fluidized-bed reactor used for the process of the present disclosure may have a calming zone with an increased diameter at its upper end so as to reduce the velocity of the circulating gas. The gas velocity in the calming zone may be from one-third to one-sixth of the gas velocity in the polymerization zone.

For removing entrained polymer particles from the reactor gas withdrawn from the reactor, the cycle gas line can be equipped with a cyclone which may be located in the cycle gas line upstream of the heat-exchanger for cooling the cycle gas.

The circulated reactor gas may be a mixture of the olefins to be polymerized and inert gases such as nitrogen and/or lower alkanes. The process for the preparation of an ethylene polymer according to the present disclosure may be conducted in the presence of nitrogen or a $C_2$-$C_5$ alkane as inert gas or in the presence of nitrogen or propane. The circulated reactor gas may further include a $C_3$-$C_6$ alkane to raise the molecular weight or specific heat of the gas in order to promote condensation. Examples of such condensing agents are propane, isobutane, cyclobutane isopentane, neopentane, n-hexane or iso-hexane. The content of $C_3$-$C_6$ alkanes in the reactor gas may be from 1 vol. % to 10 vol. %.

Furthermore, hydrogen may be added to the polymerization reactor. Hydrogen can then be added in an amount that the content of hydrogen in the reactor gas composition is from 1 vol. % to 10 vol. %.

Oxygen may also be added to the polymerization reactor. Oxygen may then be added in an amount that the content of oxygen in the reactor gas composition is from 0.1 ppm to 0.5 ppm by volume.

In the process of the present disclosure, an aliphatic carboxylic acid ester having from 8 to 24 carbon atoms, or from 10 to 20 carbon atoms, or from 12 to 18 carbon atoms is added to the polymerization. The carboxylic acid ester acts as a catalyst poison and is thus able to prevent polymer deposits in the cycle line. The aliphatic carboxylic acid ester may have a melting point, at atmospheric pressure, of less than 20° C., or of less than 10° C.

The carboxylic acid ester of the present disclosure can be any combination of one or more aliphatic monocarboxylic acids, dicarboxylic acids or tricarboxylic acids and one or more aliphatic mono-alcohols, diols or triols as long as the total number carbon atoms is from 8 to 24. The carboxylic acid ester may be a mono ester, i.e. an ester of an aliphatic mono-alcohol and an aliphatic monocarboxylic acid, of formula $R^1$—C(O)O$R^2$ in which $R^1$ and $R^2$ are a straight chain or branched $C_1$-$C_{22}$-alkyl or $C_2$-$C_{22}$-alkenyl group or a $C_3$-$C_{22}$-cycloalkyl or a $C_3$-$C_{22}$-cycloalkenyl group. In an embodiment of the present disclosure, $R^1$ has from 1 to 5 carbon atoms, or from 2 to 5 carbon atoms, and $R^2$ has from 7 to 23 carbon atoms, or from 8 to 18 carbon atoms, and or from 10 to 16 carbon atoms. In another embodiment of the present disclosure, $R^1$ has from 7 to 23 carbon atoms, or from 8 to 18 carbon atoms, or from 10 to 16 carbon atoms and $R^2$ has from 1 to 5 carbon atoms, or from 2 to 5 carbon atoms. The aliphatic acid ester may also comprise one or more additional heteroatoms of Groups 14, 15 or 16 of the Periodic Table of the Elements as long as the total number carbon atoms is from 8 to 24. Non-limiting examples of catalyst poisons are isopropyl myristate, isopropyl laurate, isopropyl palmitate, isopropyl stearate, octylacetate, ethyloleate, laurylacetate, isobutyl myristate, butyl myristate, 2-ethylhexyl myristate or ethyl myristate. In an embodiment, the carboxylic acid ester of the present disclosure is isopropyl myristate. It is also possible to use mixtures of carboxylic acid esters.

The aliphatic carboxylic acid ester may be added to the polymerization in an amount of from 0.05 ppm to 2 ppm, or from 0.1 ppm to 1 ppm, or from 0.2 ppm to 0.7 ppm with respect to the weight of the prepared ethylene polymer.

According to the present disclosure, the aliphatic carboxylic acid ester may be added at any position of the gas-phase polymerization reactor. The aliphatic carboxylic acid ester may be fed into the cycle gas system at a position up-stream the heat-exchanger or the aliphatic carboxylic acid ester may be fed into the cycle gas system at a position between the reactor and the cyclone (if present). The aliphatic carboxylic acid ester thus may have the opportunity of wetting the highly catalytically active fine dust particles. These wetted fine dust particles may then be removed from the cycle gas in the cyclone (if present). This process step may make it possible to remove the fine dust and also the aliphatic carboxylic acid ester from the circulating reactor gas, or at least to achieve a reduction in its concentration in the cycle gas. The mixture of fine dust and aliphatic carboxylic acid ester which has been separated off in the cyclone may be added to the polymerization product discharged from the polymerization reactor. As a result, less aliphatic carboxylic acid ester may reach the reactor where it can have an adverse effect on the polymerization reaction. Alternatively, it may be possible to add larger amounts of the aliphatic carboxylic acid ester to achieve more effective deactivation of the polymerization-active fine dust particles. In addition, fine dust which is not precipitated in the cyclone may be also wetted by the aliphatic carboxylic acid ester, wherein polymerization and deposit formation in the cycle gas system may be avoided or reduced.

In an alternative embodiment, the circulated reactor gas is not passed through a cyclone. Instead, in this embodiment, the aliphatic carboxylic acid ester may be fed at a point after the reactor up-stream the heat-exchanger, and the circulating gas is then passed to a compressor and the heat-exchanger; these equipment items may be present in either order. Optionally, the catalyst poison is fed after the reactor and after the equipment (cycle gas compressor or cycle gas cooler) and before re-circulation. The cooled and compressed cycle gas may be then introduced back into the well-mixed particle bed of the gas-phase fluidized-bed reactor via a customary gas distributor plate. This may result in homogeneous gas distribution, which ensures good mixing of the particle bed.

In an embodiment of the process of the present disclosure, the cooling of the reactor gas in the heat-exchanger located in the cycle gas line is carried out in a way that the reactor gas is partly condensed by cooling below the dew point and the amount of liquid in the reactor gas returned to the polymerization reactor is from 0.5 wt. % to 10 wt. %, or from 1 wt. % to 8 wt. %, or from 2 wt. % to 6 wt. %. The liquefied part of the reactor gas may be returned to the reactor together with the remaining gas as a two-phase mixture. It is however also possible to separate the liquid and the gaseous phase and return both portions separately to the reactor.

The polymerization of the present disclosure is carried out at a temperature from 30° C. to 130° C., or from 108° C. to 125° C., or from 110° C. to 120° C., or from 108° C. to 116° C.

According to the process of the present disclosure, the polymerization is carried out at a pressure from 0.1 MPa to 20 MPa, or from 0.5 MPa to 10 MPa, or from 1.0 MPa to 5 MPa.

The polymerization may carried out in the presence of an aluminum alkyl of formula $AlR_3$ or of formula $AlR_nR'_m$, in which R is, independently of each other, a $C_4$-$C_{12}$-alkyl, or a $C_6$-$C_{10}$-alkyl, R' is, independently of each other, a $C_4$-$C_{24}$-alkanediyl group which is bridging two aluminum atoms, and n+m=3. Examples of aluminum alkyls of formula $AlR_3$ are tri-isobutylaluminum, tri-n-hexylaluminum, tri-n-octylaluminum, tri-n-decylaluminum, or tridodecylaluminum. An example for an aluminum alkyl of formula $AlR_nR'_m$ is isoprenylaluminum which has the formula $(i-C_4H_9)_mAl(C_5H_{10})_n$ with n/m≥3.5. Aluminum alkyls for the process of the present disclosure may be tri-isobutylaluminum, tri-n-hexylaluminum, tri-n-octylaluminum or tri-n-hexylaluminum. It is also possible to conduct the process of the present disclosure in the presence of a mixture of such aluminum alkyls.

The aluminum alkyl compound can bed fed to the polymerization reactor as such. The aluminum alkyl may be fed as a solution, for example as a solution in a hydrocarbon solvent like n-hexane or iso-hexane or as a solution in a mineral oil. The concentration of aluminum alkyl in a solution to be fed to the polymerization reactor may be from 0.5 wt. % to 5 wt. %, or from 1 wt. % to 3 wt. %

The aluminum alkyl may be fed into the polymerization reactor in an amount which is in the range of from 0.0025 to 0.1 mole per ton of ethylene dosed into the polymerization reactor. The amount of aluminum alkyl fed into the polymerization reactor may be from 0.005 to 0.05 mole per ton of prepared ethylene polymer or from 0.01 to 0.04 mole per ton of prepared ethylene polymer.

The aluminum alkyl can be fed to polymerization process by introducing the aluminum alkyl into the polymerization reactor at any point of the reactor; or the aluminum alkyl is introduced into the polymerization reactor at a position where the reactor bed is present or the aluminum alkyl is introduced into the cycle gas line.

The gas-phase polymerization reactor, in which the process of the present disclosure is conducted, may be a single polymerization reactor. The gas-phase polymerization reactor may also be part of a reactor cascade of two or more polymerization reactors. The polymerization reactors of the cascade may all be gas-phase reactors. In an embodiment of the present disclosure, the reactor cascade is a series of two fluidized-bed reactors or a reactor cascade comprising a fluidized-bed reactor and a multizone circulating reactor in which the fluidized-bed reactor may be arranged upstream of the multizone circulating reactor. Such a reactor cascade of gas-phase reactors may further comprise additional polymerization reactors. Further reactors of such a reactor cascade can however also be of any kind of low-pressure polymerization reactors such as suspension reactors and may include a pre-polymerization stage.

The process of the present disclosure may be carried out in the presence of an antistatic agent. All antistatic agents, which are able to avoid electrostatic charging, may be used in the process of the present disclosure. Common antistatic agents comprise antistatically acting compounds which have polar functional groups such as acid or ester groups, amine or amide groups or hydroxyl or ether groups. Examples of antistatically acting compounds are polysulfone copolymers, polymeric polyamines, oil-soluble sulfonic acids, polysiloxanes, alkoxyamines, polyglycol ethers, etc. Quite efficient as antistatic agents are further compositions which comprise more than one antistatically acting compound. An overview of antistatic agents for polymerization processes is given in EP 0 107 127 A1. Examples of antistatic agents are Statsafe™ 3000 and Statsafe™ 6000 commercially available from Innospec Speciality Chemicals According to an embodiment of the present disclosure, the antistatic agent is a mixture comprising an oil-soluble surfactant, water, and optionally an alcohol. For utilizing such mixtures, a mixture of the oil-soluble surfactant, the water, optionally the alcohol, and one or more aliphatic hydrocarbons may be prepared and then the mixture is introduced into the polymerization reactor. The mixtures may comprise from 10 to 69.9 wt. % of oil-soluble surfactant, from 0.1 to 2 wt. % of water, from 0 to 15 wt. % of alcohol and from 30 to 89.9 wt. % of aliphatic hydrocarbon or the mixtures comprise from 20 to 50 wt. % of oil-soluble surfactant, from 0.2 to 1 wt. % of water, from 2 to 10 wt. % of alcohol and from 40 to 77.8 wt. % of aliphatic hydrocarbon. The oil-soluble surfactant my be an ionic oil-soluble surfactant or a strong organic acid comprising a hydrocarbyl group of from 6 to 40 carbon atoms. Classes of organic acids which may be employed are organic sulfonic acids, organic sulfinic acids or organic phosphonic acids, or the organic acid is a sulfonic acid. Representatives of such oil-soluble surfactants are dinonylnaphthylsulfonic acids and dodecylbenzenesulfonic acids. Alcohols may be linear or branched $C_1$-$C_{12}$ alcohols, which can be mono alcohols, diols or triols, or the alcohols are mono-alcohols having from 1 to 4 carbon atoms, or the alcohol is methanol, ethanol or isopropanol. Hydrocarbons for preparing the antistatic mixtures may be propane, isobutane, n-hexane, isohexane, EXXOL® grades obtainable from ExxonMobil Chemical or white mineral oils. The amount of oil-soluble surfactant introduced into the polymerization reactor may be from 0.025 to 50 ppm per weight, with respect to the weight of the prepared ethylene polymer, and the amount of water introduced into the polymerization reactor may be from 0.005 to 0.5 ppm per weight with respect to the weight of the prepared ethylene polymer. The amount of alcohol introduced into the polymerization reactor may be from 0.05 ppm to 5 ppm per weight, with respect to the weight of the prepared polyethylene. Such antistatic agents are described in WO 2014/198693 A1.

The aliphatic carboxylic acid ester may be added to the polymerization together with another polymerization process additive. Such polymerization process additives, which can be fed into the polymerization reactor together with the aliphatic carboxylic acid ester, may be, for example, antistatic agents or aluminum alkyls.

The residence time of the mixture of reactants including gaseous and liquid reactants, catalyst, and polymer particles in the polymerization reactor may be in the range from 1 to about 6 hours, or in the range from 1.5 to about 4 hours.

The process of the present disclosure allows efficiently preparing ethylene homopolymers or ethylene copolymers in the presence of a chromium catalyst with high catalyst productivity without operational problems such as fouling or sheeting in the cycle gas line or formation of fines and which results in ethylene polymers with outstanding optical, mechanical and processing properties and a low gel content.

The process of the present disclosure may be employed for the preparation of polyethylenes having a relatively high molecular weight. The polyethylenes may have a $MFR_{21.6}$ at a temperature of 190° C. under a load of 21.6 kg, determined according to DIN EN ISO 1133:2005, condition G, of from 0.1 to 100 g/10 min, or of from 1 to 20 g/10 min, or of from 1.2 to 12 g/10 min. The ratio of $MFR_{21.6}$ and $MFR_5$, determined according to DIN EN ISO 1133:2005, condition T, at a temperature of 190° C. under a load of 5 kg, may be from 10 to 40, or from 12 to 30, or from 15 to 25.

Polyethylenes obtained by the process of the present disclosure may have a density according to DIN EN ISO 1183-1:2004, Method A at 23° C. in the range of from 0.918 g/cm³ to 0.970 g/cm³, or in the range of from 0.935 g/cm³ to 0.968 g/cm³. or in the range of from 0.940 g/cm³ to 0.960 g/cm³.

Polyethylenes obtained by the process of the present application may have a content of vinyl groups/1000 carbon atoms, determined by means of IR in accordance with ASTM D 6248 98, of not more than 1.2, or have a content of vinyl groups/1000 carbon atoms in the range from 0.5 to 1.0.

The polyethylenes obtained by the process of the present disclosure process are characterized by a low level of polymer gels. In an embodiment of the present disclosure, the number of gels, determined by preparing a 50 µm cast film, analyzing the film defects by means of an optical scanning device and classifying and counting the film defects according to their size, is not more than 1000/m², or not more than 800/m², or not more than 500/m².

The polyethylenes obtained by the process of the present disclosure process are further characterized by a low content of catalyst residues. The ash content of the obtained polyethylene, determined according to DIN EN ISO 3451-1: 2008-11, may be not more than 250 ppm, or not more than 200 ppm, or not more than 150 ppm.

The processes of the present disclosure are distinguished in that the utilized Phillips-type catalysts achieve high productivity, i.e. produce a high amount of polymer per amount of employed catalysts and the polymerization results in a low amount of fines and low electrostatics.

The technology is illustrated below with the aid of examples, without being restricted thereto.

EXAMPLES

The melt flow rate $MFR_{21.6}$ was determined according to DIN EN ISO 1133-1:2005, condition G at a temperature of 190° C. under a load of 21.6 kg.

The density was determined according to DIN EN ISO 1183-1:2004, Method A (Immersion) with compression molded plaques of 2 mm thickness. The compression molded plaques were prepared with a defined thermal history: Pressed at 180° C., 20 MPa for 8 min with subsequent crystallization in boiling water for 30 min.

The tensile-impact strength was determined according to ISO 8256:2004 using type 1 double notched specimens according to method A. The test specimens (4×10×80 mm) were cut from a compression molded sheet which had been prepared according ISO 1872-2 requirements (average cooling rate 15 K/min and high pressure during cooling phase). The test specimens were notched on two sides with a 45° V-notch. The depth was 2±0.1 mm and curvature radius on notch dip was 1.0±0.05 mm. The free length between grips was 30±2 mm. Before the measurements were taken, all test specimens had been conditioned at a constant temperature of −30° C. over a period of 2 to 3 hours. The procedure for measuring the tensile impact strength including energy correction following method A is described in ISO 8256: 2004.

The environmental stress cracking resistance was determined by a full notch creep test (FNCT) in accordance with international standard ISO 16770:2004 in aqueous surfactant solution. From the polymer sample, a compression molded 10 mm thick sheet was prepared. The bars with squared cross sections (10×10×100 mm) were notched using a razor blade on four sides perpendicularly to the stress direction. A notching device as described in M. Fleissner in Kunststoffe 77 (1987), pp. 45 was used for the sharp notch with a depth of 1.6 mm. The load applied was calculated from tensile force divided by the initial ligament area. Ligament area was the remaining area=total cross-section area of specimen minus the notch area. For FNCT specimen: 10×10 mm²−4 times of trapezoid notch area=46.24 mm² (the remaining cross-section for the failure process/crack propagation). The test specimen was loaded using standard conditions as suggested by the ISO 16770 with constant load of 6 MPa at 50° C. in an aqueous solution of 2% by weight of ARKOPAL N100. The elapsed time until the rupture of the test specimen was detected.

The swell ratio was measured in a high-pressure capillary rheometer (Rheograph25, Göttfert Werkstoff-Prüf-maschinen GmbH, Buchen, Germany) at a shear rate of 1440 s⁻¹ in a 30/2/2/20 round-perforation die with conical inlet (angle=20°, D=2 mm, L=2 mm, total length=30 mm) at a temperature of 190° C., using a laser-diode placed at a distance of 78 mm from the die exit. The extrudate was cut (by an automatic cutting device from Göttfert) at a distance of 150 mm from the die-exit, at the moment the piston reaches a position of 96 mm from the die-inlet. Swell ratio (SR) [%] is defined as difference $(d_{max}-d_d) \times 100$ divided by $d_d$ with $d_{max}$ being the maximum diameter of the strand and $d_d$ being the diameter of the die; $SR°=° (d_{max}-d_d)° 100\%°/d_d$.

The number of gels was determined by preparing a 50 μm cast film, analyzing the film defects by means of an optical scanning device and classifying and counting the film defects according to their size (circle diameter). The films were prepared by an extruder (type ME20) equipped with a chill roll and winder, model CR-9, and analyzed by an optical film surface analyzer with flash camera system, model FTA100 (all components produced by OCS Optical Control Systems GmbH, Witten, Germany). The apparatus had the following characteristics
- screw diameter: 20 mm;
- screw length: 25 D;
- compression ratio: 3:1;
- screw layout 25 D: 10 D feeding, 3 D compression, 12 D metering;
- dimensions: 1360×650×1778 mm³ (L×W×H; without die);
- die width (slit die): 150 mm;
- resolution: 26 μm×26 μm;

and was operated under the following conditions
- T 1: 230° C.;
- T 2: 230° C.;
- T 3: 230° C.;
- T 4 (adapter): 230° C.;
- T 5 (die): 230° C.;
- die: slit die 150 mm;
- take off speed: 3.0 m/min;
- screw speed: to be adjusted to film thickness 50 μm;
- throughput: 1.0 to 1.5 kg/h (target 1.15 kg/h);
- air shower: on −5 m³/h,
- chill roll temperature: 50° C.;
- vab chill roll: 4 N;
- winding tensile force: 4 N,
- draw off strength: 5 N;
- camera threshold threshold 1: 75%-threshold 2: 65%.

For starting the measurement, the extruder and take off unit were set to the specified conditions and started with a material having a known gel level. The film inspection software was started when the extruder showed steady conditions of temperature and melt pressure. After having operated the extruder with the starting material for at least half an hour or after the gel count reached the known gel level, the first sample to measure was fed to the extruder. After reaching a stable gel level for 45 minutes the counting process was started until the camera had inspected an area of at least 3 m² of film. Thereafter the next sample was fed to the extruder and after having again reached a stable gel count for 45 minutes the counting process for the next sample was started. The counting process was set for all samples in a way that the camera inspected an area of at least 3 m² of film and the number of measured defects per size-class was normalized to 1 m² of film.

Example 1

Preparation of Phillips-Type Catalyst

A Phillips-type catalyst was prepared as in Example 1 of WO 99/29736 A1 except that an amount of $Cr(NO_3)_3 \cdot 9H_2O$ solution was used such that the resulting intermediate contained 0.3 wt. % of chromium and that the chromium-doped support was activated at 560° C.

Examples 2

Polymerization

A high-density polyethylene was prepared using the catalyst obtained in Example 1. The polymerization was carried out in a stainless steel fluidized bed reactor having an internal diameter of 500 mm equipped with a gas circulation system comprising a cycle gas line having a cyclone upstream of a heat exchanger, control systems for controlling temperature and pressure and feeding lines for ethylene, 1-hexene, nitrogen and n-hexane. The reactor pressure was controlled to be 2.2 MPa. 1-Hexene was introduced into the reactor at a rate of 9 kg per ton of prepared polyethylene. The feeding of the other compounds was controlled to obtain a reactor gas composition of 55 vol. % ethylene and 4 vol. % n-hexane, with the remainder being 1-hexene and nitrogen.

The catalyst was injected in a discontinuous way by means of a dosing valve with nitrogen. In addition, trihexylaluminum (THA; obtained from Chemtura Organometallics GmbH, Bergkamen, Germany) was added to the reactor in an amount of 10 ppm per weight THA with respect to the weight of the prepared polyethylene, and an antistatic agent was added to the reactor in an amount of 8 ppm per weight with respect to the weight of the prepared polyethylene. The antistatic agent was a mixture of 0.6 wt. % water, 6 wt. % isopropanol, 30 wt. % dodecylbenzenesulfonic acid and 63.4 wt. % n-heptane which had previously been prepared by shaking the components until a clear homogeneous stable formulation had been obtained.

Isopropyl myristate (IPM) was metered as a 0.04 wt. % solution in hexane via a nozzle into the cycle gas line at the midpoint of the distance from the entry of the reactor gas into the cycle gas line and the entry of the reactor gas into the cyclone. The amount of added isopropyl myristate was 0.7 ppm per weight with respect to the weight of the prepared polyethylene.

After three days of very smooth polymerization without chunk formation or any disruption of the discharge system, the operation was stopped for inspection of the polymerization reactor, cycle gas line, cyclone and heat-exchanger. No fouling or layer formation could be observed in the equipment parts.

The reaction conditions in the polymerization reactor and the properties of the obtained polyethylene are reported in Table 1.

Example 3

The polymerization of Example 2 was repeated, except that the amount of added isopropyl myristate was reduced to 0.4 ppm per weight with respect to the weight of the prepared polyethylene.

After three days of very smooth polymerization without chunk formation or any disruption of the discharge system, the operation was stopped for inspection of polymerization reactor, cycle gas line, cyclone and heat-exchanger. No fouling or layer formation could be observed in the equipment parts.

The reaction conditions in the polymerization reactor and the properties of the obtained polyethylene are reported in Table 1.

Example 4

The polymerization of Example 2 was repeated, except that the amount of added isopropyl myristate was reduced to 0.3 ppm per weight with respect to the weight of the prepared polyethylene.

After three days of very smooth polymerization without chunk formation or any disruption of the discharge system, the operation was stopped for inspection of polymerization reactor, cycle gas line, cyclone and heat-exchanger. No fouling or layer formation could be observed in the equipment parts.

The reaction conditions in the polymerization reactor and the properties of the obtained polyethylene are reported in Table 1.

Comparative Example A

The polymerization of Example 2 was repeated, except that no catalyst poison was metered into the cycle gas line.

Comparative Example C

The polymerization of Example 4 was repeated, except that a 0.04 wt. % solution of isopropanol in hexane was metered into the cycle gas line.

After three days of very smooth polymerization without chunk formation or any disruption of the discharge system, the operation was stopped for inspection of polymerization reactor, cycle gas line, cyclone and heat-exchanger. No fouling or layer formation could be observed in the equipment parts.

The reaction conditions in the polymerization reactor and the properties of the obtained polyethylene are reported in Table 1.

TABLE 1

|  | Example 2 | Example 3 | Example 4 | Comparative Example A | Comparative Example B | Comparative Example C |
|---|---|---|---|---|---|---|
| Catalyst poison | IPM | IPM | IPM | — | Atmer 163 | i-propanol |
| Amount of catalyst poison [ppm] | 0.7 | 0.4 | 0.3 | — | 0.7 | 0.3 |
| Reactor temperature [° C.] | 115.7 | 116.0 | 116.2 | 116.3 | 116.2 | 115.0 |
| Residence time [h] | 2.9 | 3.0 | 3.0 | 2.9 | 2.8 | 3.1 |
| Productivity [g of PE/g of solid catalyst] | 8880 | 9880 | 10675 | 10760 | 10640 | 8720 |
| $MFR_{21.6}$ [g/10 min] | 5.9 | 5.6 | 5.9 | 5.8 | 5.8 | 5.9 |
| Density [g/cm$^3$] | 0.9448 | 0.9446 | 0.9444 | 0.9446 | 0.944 | 0.9445 |
| Tensile impact strength [kJ/m$^2$] | 164 | 177 | 172 | 170 | 167 | 161 |
| FNCT [h] | 33 | 29 | 29 | 29 | 23 | 27 |
| Swell ratio [%] | 199 | 197 | 199 | 200 | 201 | 197 |
| Gel count |  |  |  |  |  |  |
| 450-600 μm [1/m$^2$] | 82 | 71 | 67 | 478 | 110 | 116 |
| 600-700 μm [1/m$^2$] | 16 | 12 | 9 | 134 | 18 | 22 |
| 700-1500 μm [1/m$^2$] | 9 | 7 | 10 | 16 | 13 | 15 |
| 1500-10000 μm [1/m$^2$] | 0 | 0 | 0 | 0 | 0 | 0 |
| >10000 μm [1/m$^2$] | 0 | 0 | 0 | 0 | 0 | 0 |
| Total number of gels |  |  |  |  |  |  |
| >450 μm [1/m$^2$] | 107 | 90 | 86 | 628 | 141 | 153 |

After three days of smooth polymerization without chunk formation or any disruption of the discharge system, the operation was stopped for inspection of polymerization reactor, cycle gas line, cyclone and heat-exchanger. Some fouling could be observed in the heat-exchanger.

The reaction conditions in the polymerization reactor and the properties of the obtained polyethylene are reported in Table 1.

Comparative Example B

The polymerization of Example 2 was repeated, except that a 0.04 wt. % solution of Atmer 163 in hexane was metered into the cycle gas line.

After three days of very smooth polymerization without chunk formation or any disruption of the discharge system, the operation was stopped for inspection of polymerization reactor, cycle gas line, cyclone and heat-exchanger. A yellow sticky layer of polymer fines could be observed in the cycle gas line directly after the injection point of the Atmer 163.

The reaction conditions in the polymerization reactor and the properties of the obtained polyethylene are reported in Table 1.

While multiple embodiments are disclosed, still other embodiments will become apparent to those skilled in the art from the following detailed description. As will be apparent, certain embodiments, as disclosed herein, are capable of modifications in various obvious aspects, all without departing from the spirit and scope of the claims as presented herein. Accordingly, the drawings and detailed description are to be regarded as illustrative in nature and not restrictive.

What is claimed is:

1. A continuous process for the preparation of ethylene homopolymers or ethylene copolymers comprising polymerizing ethylene or copolymerizing ethylene and one or more other olefins in the presence of a chromium catalyst in a gas-phase polymerization reactor, which contains a reactor bed of particulate polymer and which is equipped with a cycle gas line for withdrawing reactor gas from the reactor, leading the reactor gas through a heat-exchanger for cooling and feeding the reactor gas back to the reactor, wherein the polymerization is carried out at a temperature from 30° C. to 130° C. and a pressure of from 0.1 to 10 MPa and an aliphatic carboxylic acid ester, wherein the aliphatic carboxylic acid ester is selected from the group consisting of isopropyl myristate, isopropyl laurate, isopropyl palmitate, isopropyl stearate, octylacetate, ethyloleate, laurylacetate, isobutyl myristate, butyl myristate, 2-ethylhexyl myristate, ethyl myristate and mixtures thereof.

2. The process of claim 1, wherein the aliphatic carboxylic acid ester is fed into the cycle gas system at a position upstream of the heat-exchanger.

3. The process of claim 1, wherein the cycle gas line is equipped with a cyclone upstream of the heat-exchanger and the aliphatic carboxylic acid ester is fed into the cycle gas system at a position between the reactor and the cyclone.

4. The process of claim 3, wherein a mixture of fine dust and aliphatic carboxylic acid ester which has been separated off in the cyclone is added to the polymerization product discharged from the polymerization reactor.

5. The process of claim 1, wherein the aliphatic carboxylic acid ester is added in an amount of from 0.05 ppm to 2 ppm with respect to the weight of the prepared ethylene polymer.

6. The process of claim 1, wherein the aliphatic carboxylic acid ester has a melting point of less than 20° C.

7. The process of claim 1, wherein the aliphatic carboxylic acid ester is added together with another polymerization process additive.

8. The process of claim 1, wherein ethylene is copolymerized with 1-butene or with 1-hexene or with mixtures thereof.

9. The process of claim 1, wherein the chromium catalyst is a Phillips-type chromium catalyst which has been activated at a temperature of from 350° C. to 1000° C.

10. The process of claim 1, wherein the reactor gas comprises one or more $C_3$-$C_6$ alkanes.

11. The process of claim 10, wherein the content of $C_3$-$C_6$ alkanes in the reactor gas is from 1 vol. % to 10 vol. %.

12. The process of claim 1, wherein the polymerization is carried out in the presence of an aluminum alkyl.

13. The process of claim 1, wherein the ethylene polymer has a density determined according to DIN EN ISO 1183-1:2004, Method A at 23° C. of from 0.918 g/cm³ to 0.970 g/cm³.

14. The process of claim 1, wherein the ethylene polymer has a melt flow rate $MFR_{21}$, determined according to DIN EN ISO 1133:2005 at a temperature of 190° C. under a load of 21.6 kg from 0.1 g/10 min to 100 g/10 min.

15. A continuous process for the preparation of ethylene homopolymers or ethylene copolymers comprising polymerizing ethylene or copolymerizing ethylene and one or more other olefins in the presence of a chromium catalyst in a gas-phase polymerization reactor, which contains a reactor bed of particulate polymer and which is equipped with a cycle gas line comprising a heat-exchanger and a cyclone upstream of the heat-exchanger for withdrawing reactor gas from the reactor, leading the reactor gas through the heat-exchanger for cooling and feeding the reactor gas back to the reactor, wherein the polymerization is carried out at a temperature from 30° C. to 130° C. and a pressure of from 0.1 to 10 MPa and an aliphatic carboxylic acid ester is fed into the cycle gas system at a position between the reactor and the cyclone,
wherein the aliphatic carboxylic acid ester is selected from the group consisting of isopropyl myristate, isopropyl laurate, isopropyl palmitate, isopropyl stearate, octylacetate, ethyloleate, laurylacetate, isobutyl myristate, butyl myristate, 2-ethylhexyl myristate, ethyl myristate and mixtures thereof.

16. The process of claim 15, wherein a mixture of fine dust and aliphatic carboxylic acid ester which has been separated off in the cyclone is added to the polymerization product discharged from the polymerization reactor.

17. A continuous process for the preparation of ethylene homopolymers or ethylene copolymers comprising polymerizing ethylene or copolymerizing ethylene and one or more other olefins in the presence of a chromium catalyst in a gas-phase polymerization reactor, which contains a reactor bed of particulate polymer and which is equipped with a cycle gas line for withdrawing reactor gas from the reactor, leading the reactor gas through a heat-exchanger for cooling and feeding the reactor gas back to the reactor, wherein the polymerization is carried out at a temperature from 30° C. to 130° C. and a pressure of from 0.1 to 10 MPa and an aliphatic carboxylic acid ester and having a melting point of less than 20° C. is added,
wherein the aliphatic carboxylic acid ester is selected from the group consisting of isopropyl myristate, isopropyl laurate, isopropyl palmitate, isopropyl stearate, octylacetate, ethyloleate, laurylacetate, isobutyl myristate, butyl myristate, 2-ethylhexyl myristate, ethyl myristate and mixtures thereof.

18. The process of claim 17, wherein the aliphatic carboxylic acid ester is fed into the cycle gas system at a position upstream of the heat-exchanger.

19. The process of claim 17, wherein the cycle gas line is equipped with a cyclone upstream of the heat-exchanger and the aliphatic carboxylic acid ester is fed into the cycle gas system at a position between the reactor and the cyclone.

* * * * *

UNITED STATES PATENT AND TRADEMARK OFFICE
CERTIFICATE OF CORRECTION

PATENT NO. : 10,358,509 B2
APPLICATION NO. : 15/559792
DATED : July 23, 2019
INVENTOR(S) : Fraaije et al.

It is certified that error appears in the above-identified patent and that said Letters Patent is hereby corrected as shown below:

In the Specification

In Column 4, Line 35, delete "as" and insert -- a --, therefor
In Column 5, Line 16, after "manner" insert -- , --
In Column 8, Line 2, after "3 wt. %" insert -- . --
In Column 8, Line 12, delete "reactor;" and insert -- reactor, --, therefor
In Column 8, Line 47, after "Chemicals" insert -- . --
In Column 8, Line 61, delete "my" and insert -- may --, therefor Signed and Sealed this
Twelfth Day of July, 2022

Katherine Kelly Vidal
*Director of the United States Patent and Trademark Office*